United States Patent
Skelding

(10) Patent No.: US 8,965,713 B2
(45) Date of Patent: Feb. 24, 2015

(54) PROVIDING MEASUREMENTS RELATING TO DIFFERENT PHASE COMPONENTS OF A FLOWING FLUID

(75) Inventor: Anthony Paul Skelding, Swindon (GB)

(73) Assignee: Able Instruments & Controls Limited, Lower Earley, Reading, Berkshire (GB)

( * ) Notice: Subject to any disclaimer, the term of this patent is extended or adjusted under 35 U.S.C. 154(b) by 797 days.

(21) Appl. No.: 13/170,931

(22) Filed: Jun. 28, 2011

(65) Prior Publication Data

US 2012/0173169 A1  Jul. 5, 2012

(30) Foreign Application Priority Data

Jun. 29, 2010 (GB) .................................. 1010882.7
Jan. 19, 2011 (GB) .................................. 1100884.4

(51) Int. Cl.
*G01F 5/00* (2006.01)
*G01F 1/74* (2006.01)
*G01F 1/66* (2006.01)

(52) U.S. Cl.
CPC  *G01F 1/74* (2013.01); *G01F 1/663* (2013.01); *G01F 1/667* (2013.01); *G01F 1/668* (2013.01)

USPC ................... 702/45; 702/48; 702/50; 702/54; 73/861; 73/861.01; 73/861.04

(58) Field of Classification Search
USPC ........................................................... 702/45
See application file for complete search history.

(56) References Cited

U.S. PATENT DOCUMENTS 5,597,961 A * 1/1997 Marrelli ..................... 73/861.04
2008/0022782 A1 * 1/2008 Gysling et al. ............. 73/861.27

* cited by examiner

Primary Examiner — Mischita Henson
(74) Attorney, Agent, or Firm — King & Schickli, PLLC

(57) ABSTRACT

Apparatus (300) and method for providing measurements relating to different phase components of a flowing fluid. The apparatus includes a device (306) configured to obtain, in use, at least one input (302, 304) representing a velocity of flowing fluid produced by at least one measuring device (302, 304) non-intrusively/externally mounted on a conduit (100) containing the flowing fluid. The apparatus also includes a device (306) configured to use the at least one velocity input to calculate (308) a total volumetric flow of the flowing fluid, and a device (306) configured to use the velocity input and the calculated total volumetric flow to compute (310, 312) at least one measurement relating to at least one phase component of the flowing fluid.

12 Claims, 9 Drawing Sheets

PROVIDING MEASUREMENTS RELATING TO DIFFERENT PHASE COMPONENTS OF A FLOWING FLUID

This application claims priority to Great Britain Patent Application Serial Numbers 1010882.7, filed Jun. 9, 2010 and 1100884.4, filed Jan. 19, 2011, the disclosures of which are incorporated herein by reference.

FIELD OF THE INVENTION

The present invention relates to providing measurements relating to different phase components of a flowing fluid.

BACKGROUND TO THE INVENTION

Volumetric flow and mass flow meters are used in many applications and industries. Conventionally, for multiphase flow a collection of separate intrusive flow measurements are required to provide an independent volumetric flow measurement for each phase component of the medium. This invasive technique affects the flow rate, and also restricts the application to situations where the pipeline may be broken into to give access to the medium.

Non-intrusive clamp-on methods of flow metering exist and such meters often use Time Of Flight (TOF) ultrasonic flow measurements that send pulses, typically sent at an angle, from a first transducer through the pipe wall and then fluid flowing in a conduit and measure the time it takes for the sonic waves to reach another one of its transducers. The volumetric flow can then be calculated based on the known internal pipe area. However, TOF technology loses its ability to measure accurately when there are higher levels of gaseous or particle entrainment. Therefore, if the liquid flow has significant entrainment of gas, or solids and slurry, then Doppler technology-based measuring devices are used instead. However, Doppler technology also has limitations and if the process had periods of low entrainment then the Doppler method is less reliable and less accurate and may possibly fail altogether if the entrainment drops significantly. With these existing technologies it is only possible to measure one single phase. The liquid TOF technology measures only one liquid phase, and the Doppler technology only measures the liquid phase during higher entrainment. The gas TOF technology can only measure gas flow when there are low levels of suspended liquid or particle entrainments in the gas flow. Gas with higher levels of suspended liquids or particles is commonly known as wet gas. Existing USM (ultrasonic meter) technology cannot measure wet gas flow, even at relatively low levels of wet gas entrainment. Therefore, it is not possible to use these existing technologies to obtain reliable measurements through phase changes for either liquid or gas with clamp-on nonintrusive technology. Further, it is not possible to measure either the gas part in a liquid flow or the liquid part in a gas flow. Also, without a means of measuring the density of the medium it is not possible to accurately determine the mass of the flow.

SUMMARY OF THE INVENTION

Embodiments of the present invention are intended to address at least some of the abovementioned problems.

Embodiments of the invention comprise a multiphase flow computer system using multiple variations of flow computers and densitometer measuring instruments to resolve flow through changing phases, measuring continually all the way from purely liquid phase through to purely gas phase. This can be achieved by using a combination of ultrasonic and nucleonic instrumentation devices. Other embodiments may (also) use inserted or wetted components and or pressure and temperature corrections if required.

Embodiments of the invention use a combination of liquid Time of Flight and liquid Doppler flow computers to measure the liquid to gas entrainment phases, and may use gas Doppler and gas Time of Flight measuring devices to measure the wet gas to gas phases. The embodiments can use a densitometer to measure the change in the density between the mixed phases, and in this manner the apparatus's multiphase meter can resolve the proportion of each phase so that it derives separate liquid and gas flow outputs, and uses changes in density and sonic velocity to determine percentage cuts of mixed liquid flows, and to determine product by its response characteristics.

Embodiments of the invention use pulsed liquid Doppler signals, where the average time of flight of the reflected Doppler signals from entrained gases in the conduit is derived into a sonic velocity measurement for deeper into the gas entrainment phase. Embodiments of the invention use the flow meter processor to cross calibrate the pulsed liquid Doppler sonic velocity measurement against the liquid TOF sonic velocity measurement during phase change periods where both technologies operate together.

Embodiments of the invention use pulsed gas Doppler signals, where the average time of flight of the reflected Doppler signals from suspended liquids in the gas phase are derived into a sonic velocity measurement for deeper into the wet gas phase. Embodiments of the invention use the flow meter processor to cross calibrate the pulsed gas Doppler sonic velocity measurement against the gas TOF sonic velocity measurement during phase change periods where both technologies are operating together.

Embodiments of the invention use the sonic velocity measurement to calculate the percentage of water cut in the liquid flow by measuring the sonic velocity of the multiphase flow where the liquid sonic velocity is directly proportional to the percentage of each liquid in the liquid phase in comparison to the sonic velocity of the separated liquids.

Embodiments of the invention use separate sonic velocity measurements of the separated liquids (such as crude oil and seawater) after the separation (such as after a separator vessel). These measurements are then fed back into the multiphase flow computer in order to set the current sonic velocity range for the multiphase sonic velocity measurement thus ensuring a more accurate calculation of percentage of differing liquid cut (such as water cut in an oil and water separation process).

Some embodiments combine the benefits of Wide Beam transit time (Time Of Flight) and Reflexor (otherwise known as Doppler) ultrasonic measurement technologies for operation in applications where zero to high levels of gas entrainment and/or high volumes of solid particulates are experienced. The apparatus can make a continuous flow measurement under these changing process conditions, whilst measuring various physical parameters, such as aeration and sonic velocity in the medium. Code executing on a processing unit of the apparatus can modify the method of measurement as the process conditions change. In some embodiments a densitometer adds volume correction for the liquid measurement where the liquid volume becomes expanded due the gas volume in the flow during high gas entrainment periods. The densitometer can therefore also offer the option to quantify the gas phase measurement by the percentage of the liquid and gas parts in the dual phase flow measurement. The volume of the gas can then be calculated.

In some embodiments, flow measurement is achieved via sonic technology. A combination of wide beam Time of Flight for high-low gas entrainment conditions, and Reflexor/Doppler technology for conditions of higher aeration and slugging can be utilised. Interrogation of current fluid properties combined with intelligent voting logic may dictate the degree to which each technology is used. Also, during periods of combined operation of the transit time and Doppler systems the apparatus can calibrate the Doppler meter to provide optimum performance when high levels of gas are present. This method can offer continuous measurement and continuous accountability. Some embodiments use dual ultrasonic technology for accurate and continuous measurement during phase changes, whereas other embodiments incorporate additional nuclear densitometer technology to measure mass flow, and provide further accuracy of measurement during extreme phase combinations. Some embodiments incorporate pressure and temperature measurements to make corrective adjustments for viscosity. Some embodiments incorporate gas USM technology to measure further into the gaseous phase.

Some embodiments provide a non intrusive clamp on multiphase volumetric flow computer comprising of Time Of Flight and Doppler ultrasonic flow meters with a densitometer to measure the individual components of a complex product flow, such as a mixture of crude oil, seawater and gas, giving separate metered volumetric outputs for each phase component. Other embodiments provide a non intrusive multiphase flow meter where the gas component of the flow is calculated from the mathematical product of the density measurement and liquid sonic velocity. The change in density can be directly proportional to the percentage gas volume for a given sonic velocity for a given liquid cut mix.

According to another embodiment there is provided a non intrusive multiphase flow meter where due to compensating for density changes, the percentage out of the liquids (such as an oil and water mix) is directionally proportional to the measured sonic velocity of the liquid phase of the flow. Another embodiment provides a non intrusive multiphase flow meter where the sonic velocity range for the percentage water cut such as in a water and oil mixture, is measured after the separation of the liquids (such as after the production separator vessel) so that the sonic velocity of each separate component is more accurately measured thus ensuring a higher accuracy of water cut measurement before the separation.

Yet another embodiment provides a non intrusive multiphase flow meter where the fluid sonic velocity measurement is derived deeper into the gas phase from both the liquid time of flight signals and the timing of the Doppler reflection signals, where the mean value of the transit time of the reflected Doppler signals is proportional to the fluid sonic velocity of the liquid phase of the multiphase flow. Another embodiment comprises a non intrusive multiphase flow meter where the Doppler flow velocity and fluid sonic velocity measurements are cross calibrated against the Time Of Flight flow and fluid sonic velocity measurements during the phase change periods where both TOF and Doppler technologies are operational.

According to another embodiment there is provided a non intrusive multiphase flow meter where wet gas is measured by use of a gas Doppler transducer, where the ultrasonic path is through the gas, and the velocity is measured by the frequency shift according to the velocity of the reflected signals from the suspended liquid and solid particles in the gas. Another embodiment provides a non intrusive multiphase flow meter where the inventive principles and method for predominantly liquid based multiphase flow with gas entrainment is inverted so as to apply the same principles to predominantly gas based multiphase flow with liquid entrainment using gas Time Of Flight and gas Doppler velocity meters with a densitometer in the same manner as for predominantly liquid based measurements.

Other embodiments comprise a non intrusive multiphase flow meter where the predominantly liquid based method is combined with the predominantly gas based method so that the entire phase range from 100% liquid flow through to 100% gas flow is achieved whilst metering the individual phase components as separate metered outputs. Another embodiment comprises a non intrusive multiphase flow meter where the flow computer compares the different flow meter input measurements during phase changes against a master rolling average to resolve the master meter for the present phase condition. The other meters can be recalibrated against the master meter to resolve the most accurate flow measurements through periods of changing phases and multiphase flow compositions.

Another embodiment proves a non intrusive multiphase flow measurement where the separately metered volumetric outputs are calculated into mass flow measurements by use of temperature, pressure and density calculations.

According to an aspect of the present invention there is provided apparatus adapted to provide measurements relating to different phase components of a flowing fluid, the apparatus including:

a device configured to obtain at least one input representing a velocity of flowing fluid;

a device configured to use the at least one velocity input to calculate a total volumetric flow of the flowing fluid, and a device configured to use the velocity input and the calculated total volumetric flow to compute at least one measurement relating to at least one phase component of the flowing fluid.

The velocity input may be received from at least one Doppler measuring device and/or from at least one Time of Flight measuring device. The at least one Doppler measuring device and/or the at least one Time of Flight measuring device may comprise a gas measuring device. The at least one Doppler measuring device and/or the at least one Time of Flight measuring device may comprise a liquid measuring device. At least some of the measuring devices may be expected to be suitable for providing accurate measurements for different phase components of the flowing fluid. The measuring devices may be selected from a set including:

a said measuring device suitable for liquid phase components of the flowing fluid;

a measuring device suitable for liquid-gas transition phase components of the flowing fluid;

a measuring device suitable for gas entrainment phase components of the flowing fluid, and/or a measuring device suitable for gas phase components of the flowing fluid.

The measuring devices may be non-intrusive/mounted externally to a conduit containing the flowing fluid. The measurement devices may comprise clamp-on type devices.

The apparatus may further include at least one densitometer device for performing correction of the calculated total volumetric flow based upon changes in measured density of the flowing fluid. The changes in the measured density of the flowing fluid can be used to resolve a proportion of each phase component in the flowing fluid, thereby deriving separate liquid and gas flow rate outputs. The device may be configured to receive at least one input is configured to receive input from a temperature sensor and/or a pressure sensor. The inputs from the temperature input and/or the pressure input can be used to resolve viscosity calculations for compensation of the calculation of the total volumetric flow.

At least some components of the apparatus may be contained in a housing remote from the measuring devices. The apparatus may include a protective shroud that covers the apparatus components and/or lines between the components to provide protection from vibration or physical abuse.

According to another aspect of the present invention there is provided a system including apparatus substantially as described herein and a plurality of measuring devices for measuring the velocity of the flowing fluid.

According to a further aspect of the present invention there is provided a method of providing measurements relating to different phase components of a flowing fluid, the method including:

obtaining at least one input representing a velocity of flowing fluid;

using the at least one velocity input to calculate a total volumetric flow of the flowing fluid, and using the velocity input and the calculated total volumetric flow to compute at least one measurement relating to at least one different phase component of the flowing fluid.

The measurements relating to different phase components may comprise a volumetric flow of a gas component of the flowing fluid. The measurements representing density of the flowing fluid are received and the volumetric flow of the gas component can be calculated using a formula:

Gas volumetric flow=total volumetric flow−((measured density/base density)×total volumetric flow), where the base density is calculated using a formula:

base density=(measured liquid velocity/highest liquid velocity)×highest density, where the highest density is a density of a liquid in the flowing fluid having a highest density; and the highest liquid velocity is a velocity of the liquid in the flowing fluid having a highest velocity.

The flowing fluid can comprise at least two different types of liquid and the method can further include determining proportions of the different types of liquid. The determining of the proportions of the different types of liquids can include:

obtaining data representing sonic velocities of the different types of liquid following separation of the liquid;

using the obtained velocity data and the at least one input representing a velocity of flowing fluid to calculate the proportions of the different types of fluid;

selecting a preferred one of the inputs dependent on expected accuracy in current fluid flow conditions, and using the preferred input to compute the total volumetric flow rate of the flowing fluid.

The method may further include comparing the at least some of the inputs with a historical average flow dataset to perform the selection of the preferred input. The comparison may include considering mean deviation of the inputs over a number of previous readings. The method may use an intelligent voting logic technique to select the preferred input. The preferred input may can be selected as a master input that is used to cross-calibrate the other inputs. The other inputs can be gradually adjusted to be in agreement with the master input over a period of time.

The method may include calculating proportions (or percentages) of liquid(s) and gas in the flowing fluid based on the calculated volumetric flow of the gas component of the flowing fluid.

According to another aspect of the present invention there is provided a computer program element comprising: computer code means to make a computer execute a method substantially as described herein.

According to another aspect of the present invention there is provided volumetric flow rate meter apparatus including:

an input device configured to receive, in use, inputs from a plurality of measuring devices that measure velocity of flowing fluid;

a selection device adapted to select a preferred one of the measuring devices dependent on expected accuracy in current fluid flow conditions, and a computing device adapted to use a measurement from the preferred measuring device to compute a volumetric flow rate of the flowing fluid.

The apparatus may further include a densitometer device. The densitometer can be used to perform correction of flow volume based upon changes to density of the fluid. Embodiments can use a densitometer to measure the change in the density between mixed phases of the fluid in order to resolve a proportion of each phase in the fluid, thereby deriving separate liquid and gas flow outputs. Data relating to changes in density and sonic velocity in the fluid can be used to determine percentages of mixed liquid flows, and to determine product in the fluid by its response characteristics. A formula for resolving the gas volumetric flow can be derived from measuring the change in density in comparison to the change in the sonic velocity of the medium in accord with the formulae provided herein. The apparatus may further include at least one temperature measuring device and/or at least one pressure measuring device to resolve viscosity calculations for compensation of flow measurements.

According to another aspect of the present invention there is provided a volumetric flow metering system including apparatus substantially as described herein and at least one flow velocity measuring device.

According to yet another aspect of the present invention there is provided a method of volumetric flow rate metering including:

receiving a plurality of inputs representing velocity of flowing fluid;

selecting a preferred one of the inputs dependent on expected accuracy in current fluid flow conditions, and using the preferred input to compute a volumetric flow rate of the flowing fluid.

The method may include comparing the at least some of the inputs with a historical average flow dataset to perform the selection of the preferred input. The comparison may include considering mean deviation of the inputs over a number of previous readings. The method may include using an intelligent voting logic technique to select the preferred input.

The preferred input may be selected as a master input that is used to cross-calibrate the other inputs. The other inputs may be gradually adjusted to be in agreement with the master meter over an extended time period. According to another aspect of the present invention there is provided a computer program element comprising: computer code means to make the computer execute methods substantially as described herein. The element may comprise a computer program product.

According to an alternative aspect of the present invention there is provided a measuring device suitable for measuring fluid flow velocity when the fluid is in gas phase.

According to another aspect of the present invention there is provided a clamp-on gas Doppler meter configured to provide measurements relating to different phase components of a flowing fluid. According to yet another aspect there is provided a system adapted to provide measurements relating to different phase components of a flowing fluid, the system including a gas Doppler meter.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which.

DETAILED DESCRIPTION OF THE INVENTION

Figure 1:
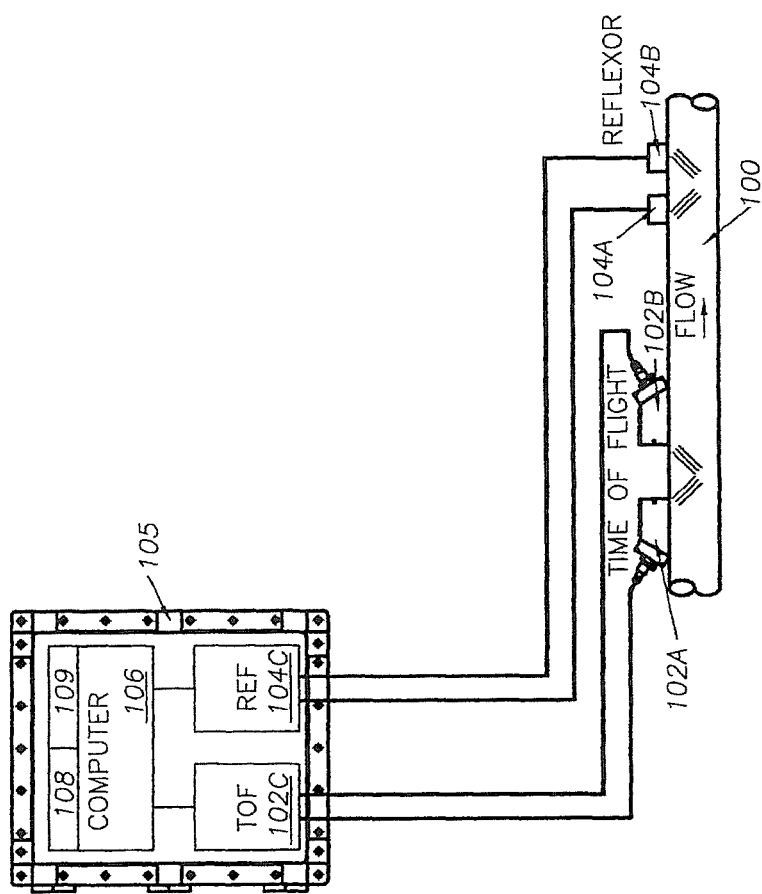
FIG. 1 is a schematic drawing of flow metering apparatus.

FIG. 1 shows a conduit 100 through which fluid flows. Although a pipe-like conduit is shown in the Figure, it will be appreciated that the metering apparatus can be used with other types of fluid conduits/containers.

A first measurement device is fitted to the conduit 100. In the example, the first measuring device comprises a known Time of Flight liquid USM flow meter 102A, 102B, such as a 1010N-S9 dual channel flow computer (which can be supplied by Able Instruments & Controls Ltd, of Reading, United Kingdom) that provides a dual path TOF flow measurement. The computer may be 24V DC or 90-250 Vac version. The measurement device may be a stand alone flow computer system, which may to be set up independently of the main flow computer system that will be described below.

In use, the TOF measuring device sends pulses from one of its transducers 102A through the liquid in the conduit and measures the time it takes for the sonic waves to reach the other transducer 102B and back. In the example shown in the Figure, the measurement device 102 is non-contact and so flow throughput of the product in the conduit is not inhibited, which results in reduced installation costs. Further, the conduit may be pigged without the complication of system shutdown or bypass. In addition, the lack of mechanical components ensures routine calibration and maintenance requirements are reduced, therefore reducing operating costs.

Transducer variants are available to suit any particular application, including up to zone 0 hazardous areas. Mounting of the clamp-on transducers may be via the Rigilock™ system, produced by Able Instruments & Controls Ltd of Reading, United Kingdom, which provides precise and positive location on the pipe. Rugged protective stainless steel shrouds may cover all or some of the apparatus/pipe hardware providing protection from vibration or physical abuse.

In the case of a clamp-on measuring device as shown in the Figure, the transducers are mounted on the outside of the pipe and the sound is conducted through the pipe. In other embodiments wetted transducers can be inserted into the pipe so that the transducers are just in contact with the liquid at the pipe wall to cause minimal disturbance to the flow. In yet another embodiment, the transducers can be fully inserted into the liquid. The clamp-on transducers can be mounted in reflect, where the sonic wave is sent against the opposite wall and back.

When the fluid in the conduit 100 flows it affects the propagation of the sonic pulse, with a different effect upstream and downstream, which can be measured and used to calculate the velocity of the flowing fluid. The volumetric flow can then be calculated by a TOF flow computer component 102C, which may be located remotely from the transducers, based upon the pipe internal area. Where necessary, such as with crude oil flow measurements, pressure and temperature inputs (from additional sensors, not shown) can be used to make corrective adjustments for viscosity. The flow measurement can be the average of several paths, where the accuracy is normally improved with a greater number of paths (than the single path shown in the Figure). In the embodiment of FIG. 1, the TOF flow computer component 102C is located in a rigid housing 105

The conduit 100 is also fitted with a Doppler technology-based measuring device 104A, 104B, such as a 1010N-S9 single channel computer (which can be supplied by Able Instruments & Controls Ltd, of Reading, United Kingdom) that provides Doppler flow measurement. As with the TOE measuring device 102, the transducers 104A, 104B may be clamp-on or located at least partially inside the conduit. The Doppler transducers send pulses through the liquid in the pipe from the transmit transducer 104A and if there are entrained gas or liquid or solid particles then the sound is reflected back to the receive transducer 104B. The frequency of the reflected wave is dependant upon the velocity of the entrained particle or bubble in the liquid. A flow computer component (component 104C located in housing 105 in the example) can convert this frequency shift back into a velocity measurement. The flow computer 104C typically collects all the velocity measurements and processes them into a velocity rate. As with the TOF measuring device, the volumetric flow can then be calculated based upon the pipe internal area using known techniques.

The apparatus of FIG. 1 is particularly suitable for heavy entrainment applications where continuous measurement is required into the gas entrainment phase. The entrainment may be gas entrainment, cavitations, sand or suspended solids in the liquid. The most usual configuration comprises dual path TOF and single path Doppler measurement devices.

The metering apparatus includes a main flow computer 106 also located in housing 105, although it will be appreciated that it may be positioned elsewhere. The main flow computer 106 includes a processor 108 and memory 109 that can be used to execute code. The code can be used to control multiple velocity measurements that enter the main flow computer via interfaces with the TOF computer component 102C and the Doppler computer component 104C. The code can provide decision making logic that allows reliable and smooth switching between the multiple flow measurements input into the flow computer 106, providing seamless and accurate measurement during the transition between measuring paths and measurement principles. The code can use mathematical averaging and smoothing to allow the seamless transition without loss of measuring accuracy. The code can also provide cross calibration between the primary (a selected "master" input) and secondary metering methods/devices to minimise measurement uncertainty during all flow conditions.

Figure 2:
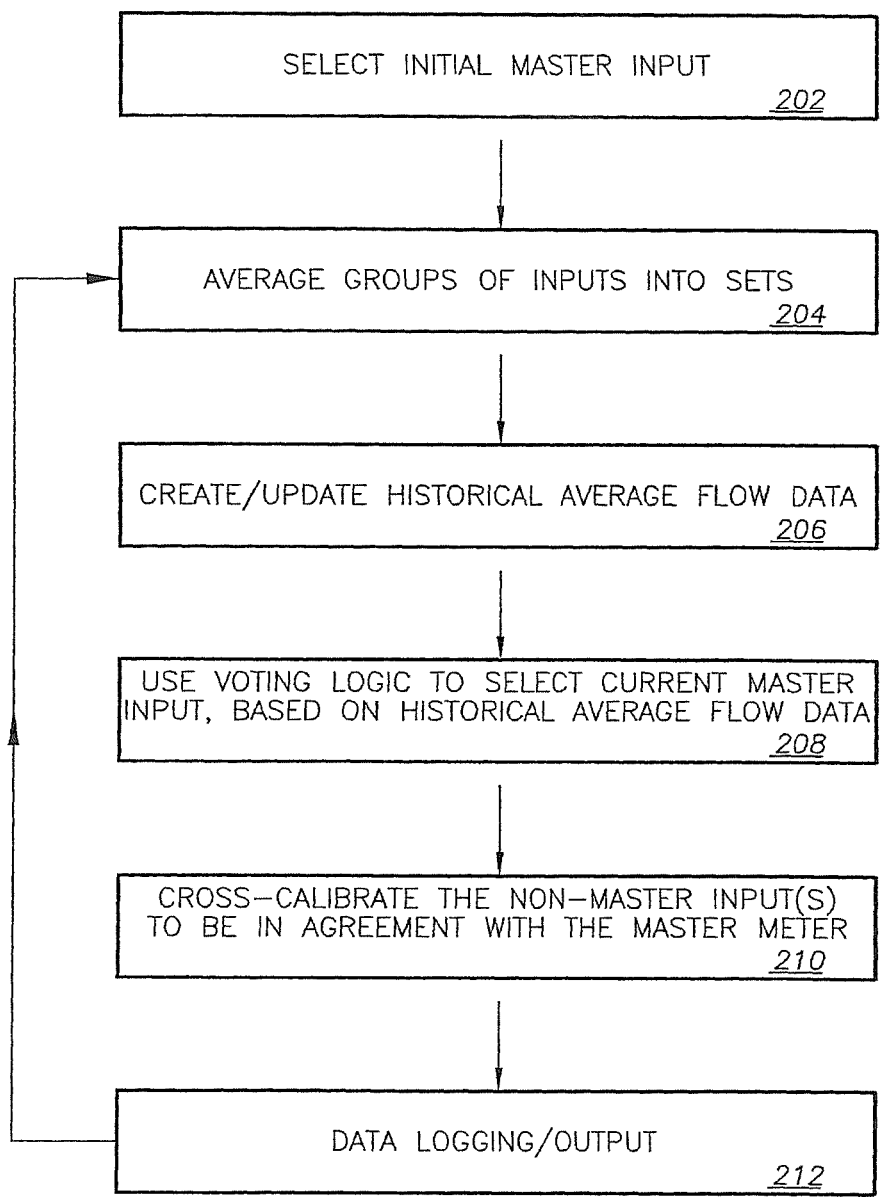
FIG. 2 is a flow chart illustrating steps performed by the flow metering apparatus.

FIG. 2 is a flowchart of steps that can be performed by the processor 108 of the main flow computer 106, It will be appreciated that in alternative embodiments, some of the steps may be omitted or re-ordered, and/or additional steps may be performed. At step 202, initialisation takes place, including selecting an initial master input. This will normally comprise the TOF meter, which is expected to be the most reliable input in many flow conditions, but another type of input could be selected initially. Where available (such as with spool meters and CTM systems) wetted TOF transducers will be initially selected as the master meter. The main flow computer may be adaptable and can use multiple flow measurement inputs. Optionally, for other embodiments where there are more than two inputs/measuring devices, groups of inputs may be averaged into sets at step 204.

At step 206 the processor 108 creates/updates a store of historical average flow data. The number of past measurement samples that are averaged, and the time period during which samples are collected, are variable parameters that can be selected during the set up of the apparatus so as to adjust sensitivity of the voting logic process. The measurement sample shift registers are regularly updated so that the older samples are overwritten as the new samples are taken at the start of the listing.

At step 208 a voting logic technique is used to compare the incoming calibrated flow measurements from the different flow meters 102C, 104C to the historical average data, to determine which incoming measurement is considered to be the most reliable under the present changing process conditions in comparison to the historical trend. The incoming meter input having a historically stable measurement with low mean deviation that is nearest the historical average data is selected as the master input. The master flow measurement/input is expected to be the most accurate flow measurement during perfect conditions. The measurement from the selected master meter is assessed by considering the mean deviation of flow measurements over a past number of readings. The amount of deviation can be a selectable variable during the set up of the apparatus. The deviation indicates the reliability of the flow data for comparison with the historical trend.

Provided that the master meter is not in fault and that also the/each other flow meter is measuring within a required bandwidth (the main flow computer can perform checks to see if this is the case), then all the other (non-master) input measurements may be very gradually adjusted to be in agreement with the master meter over an extended time period, e.g. at step 210. The allowable slew rate of this cross calibration is a variable which can be selected during the set up of the apparatus. In this way accuracy and repeatability can be achieved from all the various flow measurement inputs. A calibration factor can be adjusted so that all the metering inputs are gradually calibrated over time to be in agreement with the master meter. The bandwidth is a selectable limit on the calibration adjustment range that is permissible for each type of flow meter input. This is done smoothly in small increments to prevent any detrimental effect on the live output. Every flow path into the apparatus can be selected for cross-calibration if required. Thus, noise that could result from a non-smooth transition when "switching" inputs/measuring devices is minimised/eliminated, resulting in higher quality volumetric flow readings.

Most often in the apparatus of FIG. 1, this cross calibration of flow paths will involve calibration of the Doppler meter path against the more accurate Time Of Flight measurement. This way the apparatus can achieve greater accuracy during high aeration even when the Time Of Flight path is no longer available. However, this cross calibration facility is available for fine adjustment of other flow paths into the apparatus, especially other flow meters that can be input and processed as additional measurement paths if available and as required to improve accuracy. This is because flow computer accuracy increases with the number of flow paths available for the measurement.

The code can also deal with data logging, e.g. at step 212. Various diagnostic data outputs, such as fault conditions, sonic velocity and aeration values from the flow meters, are stored along with the raw flow data, and can be output to a programmable memory location in the flow computer memory 109. Typically this is a USB memory stick, although it may be any other convenient memory device. A separate utility program can enable the stored data to be replayed in real time, e.g. on a remote computing device, to enable future performance monitoring, although in other embodiments at least some of the logged data may be displayed on the flow computer itself. The steps can be repeated until a user stops the apparatus.

Figure 3:
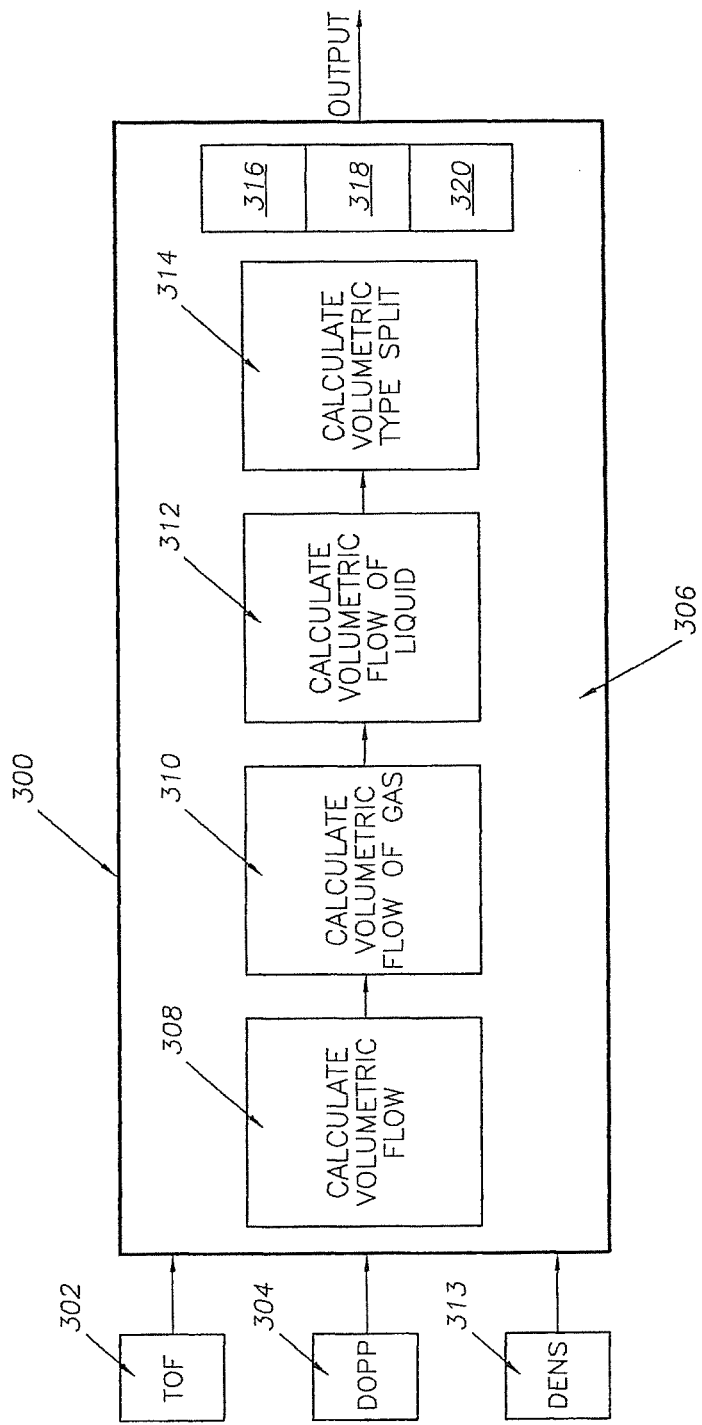
FIG. 3 is a schematic drawing of apparatus for providing an indication of volumes of different phase components in a fluid mixture flowing through a conduit.

FIG. 3 is a block diagram of apparatus 300 that is intended to provide an indication of volumes of different phase components in a fluid mixture flowing through a conduit. The apparatus 300 receives data from a plurality of measuring devices 302, 304 that measure the sonic velocity in fluid flowing through a conduit (not shown). By "sonic velocity" it is meant the speed of sound through the liquid, which can be calculated by measuring the time taken (in milliseconds) for the ultrasound signals to pass from one transducer of the measuring device to the other. Sonic velocity will differ for different liquids. It is a linear relationship for liquid mixes and can be used to determine the mixture of two liquids as a percentage cut. In the example, the measuring devices comprise a TOE flow computer 302 and a Doppler flow computer 304, preferably clamp-on devices, that transfer velocity measurements to a computing device 306.

The computing device 306 can be configured in a similar manner to the main flow computer 106 of FIG. 1. Thus, the computing device can control multiple velocity measurements from the flow computers 302 and 304 and use decision making logic to have reliable and smooth switching between the multiple flow measurements. The computing device can also be configured to provide cross calibration between the primary (a selected "master" input) and secondary metering methods/devices to minimise measurement uncertainty during all flow conditions, as described above.

The computing device 306 is further configured to use the velocity measurements to calculate 308 the total volumetric flow of the fluid mixture in the conduit being monitored. The Doppler measurement gives the flow/sonic velocity of entrained particles. Conventionally. Doppler measurements have been considered to have a high degree of uncertainty (typically more than 10%), but are the only option if there are high levels of entrainment because Time Of Flight signals are interrupted by the gas/solid particles. This uncertainty error is largely due to the unknown quantity/volume of the gas in the flow because this is not conventionally measured and gas can swell the overall fluid volume. Therefore, in the past it has not been possible to use only a Doppler meter to determine changes in the velocity measurement (in order to establish whether a change in velocity is a genuine change in liquid velocity, or a surge in gas volume (the gas volume swelling can make the liquid volume appear as if more liquid has passed)). Although this means the Doppler flow measurement is partly ambiguous for liquid volumetric flow measurement, the present inventors have established that it is possible to calibrate the Doppler measuring device in order to calculate the total volumetric flow. To achieve this, the Doppler flow meter must be calibrated against a master three phase rig. The adjustments required are developed from the calibration test points into a calibration curve and this curve is programmed into the Doppler meter to make corrections across the flow range. Finally, the whole multiphase meter must be calibrated against the three master flow rig, since the correction curves are interactive between the three phases.

The density of the mixture as it passes the transducers is measured by one or more densitometers 313 and their measurements are used to determine the volume of the gas when the Doppler flow velocity is being affected by the gas expanding the volume. The gas volume can be calculated by comparing changes in the density and in the sonic velocity. This gives a percentage of the gas present in the flow. In order to compute the volumetric flow of the gas, the total volumetric flow of the fluid must be known (the same is true of the water and crude cuts, as discussed below). The computing device 306 calculates 310 the gas-liquid flow cut, that is, out of the total volumetric flow of the fluid mixture, how much of it comprises gas and how much of it comprises liquid, and output the volumetric flow of the gas. A densitometer 313 can be used to add volume correction for the volume measurement where the liquid volume expands due to the gas volume in the flowing fluid mixture during high gas entrainment periods. The densitometer measurements can therefore be used to quantify the gas phase measurement by the percentage of the liquid and gas parts in the dual phase flow measurement. By using the formula below the volumetric flow of the gas can be calculated, where the density of the gas is considered to be negligible in comparison to the density of the liquid. The Base density represents the expected value of the liquid density, based on the measured velocity of the fluid if there was no gas. It is used in the following formula:

Base density=(measured liquid velocity/highest liquid velocity)×highest density where the "highest density" is the density value of the liquid which has the highest density (for instance, if the mix is between liquid A and liquid B, and the density of liquid A was 1000 Kg and the density of liquid B was 500 Kg then the "highest density"=1000); and the "highest liquid velocity" is the liquid in the mixture having the highest sonic velocity (for instance, if liquid A has a sonic velocity of 1300 m/s and liquid B has a sonic velocity of 1500 m/s then the highest liquid sonic velocity=1500).

The gas volumetric flow can then be determined by the following formula:

Gas volumetric flow=total volumetric flow−((measured density/base density)×total volumetric flow)

Experiments have shown that this provides an accurate measurement of volumetric flow. Assuming that the density of the gas is effectively zero in comparison to that of the liquid, then the change in the density compared to the known density of the present liquid cut (present density/base density) yields a calculation of the percentage of the flow that is not that liquid (i.e. is gas).

The volumetric flow of liquid in the fluid mixture can then be calculated at 312 by subtracting the volumetric flow of gas (calculated at 310) from the total volumetric flow (calculated at 308).

In cases where the liquid component of the total fluid mixture comprises more than one different kind of liquid, e.g. water and crude oil, along with gas entrained in the mixture, then the percentage of water and crude oil in the liquid flow can be calculated at 314 by measuring the velocity of the multiphase flowing fluid where the liquid velocity is directly proportional to the percentage of each liquid in the liquid phase, in comparison to the velocity of the separated liquids. For example, if the velocity of water is 1500 m/s and the velocity of crude oil is 1300 m/s then a 50/50 mix of water and crude oil has a velocity of 1400 m/s. This can be calculated by a formula as follows:

Percentage water cut=((mVS−cVS)/(wVS−cVS))×100 where the measured three phase velocity is mVS. Crude velocity is cVS, and Seawater velocity is wVS.

Figure 4:
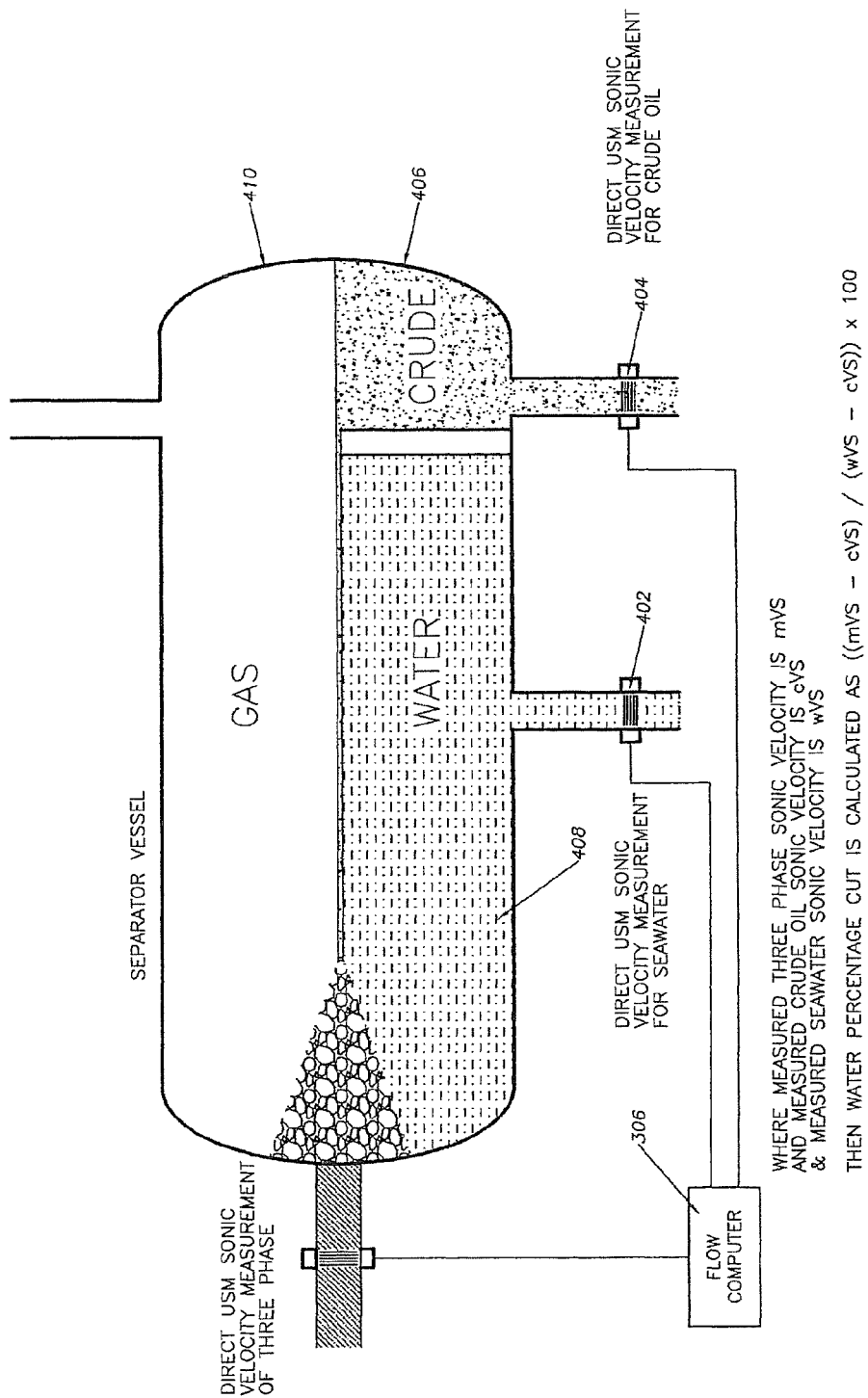
FIG. 4 illustrates use of clamp-on meters to obtain velocity measurements for liquids after separation in a separator vessel.

FIG. 4 shows apparatus having clamp-on meters 402 and 404 that can be used to obtain velocity measurements (wVS and cVS, respectively) for the separated liquids (such as crude oil 406 and seawater 408) after the separation in a separator vessel 410. A flow computer 412 is also used to measure the velocity mVS of the mixed fluid entering the separator vessel. These measurements are then fed back into the multiphase flow computer 306 in order to set the current velocity range for the multiphase velocity measurement, thus ensuring a more accurate calculation of percentage of liquid cut as described above.

Returning to FIGS. 3, at 316, 318 and 320, respectively, calibrations are performed for the crude oil, water and gas volume measurements, respectively, which involves the three phases of measurement being calibrated against a known three phase flow rig. This method of calibrating three phases will be known to the person skilled in the art of three phase meter calibrations. In brief, the three phase flow rig is set up to replicate different percentages of the three phases at different flow rates. The corresponding results from the three phase meter are recorded at these test points. These results are turned into calibration curves for all three phases and these curves are turned into calibration tables using interpellation. This table is then uploaded into the flow computer as an array, and the flow computer then uses these tables to adjust the multiphase meter to match the calibration rig results.

The output produced by the flow computer 306 can take several forms. For instance, it may output data representing the flow rates of the various components may be output, e.g. 3 liters/sec oil; 3 liters/sec water; 4 liters/sec gas. Alternatively, figures representing the calculated proportions of liquid(s) and gas as percentages (which can be routinely calculated by the skilled person using the volumetric flow information) may be output. It will be appreciated that in some embodiments, the output (and related processing) may be limited to only producing information regarding one specific phase component of the flowing fluid, e.g. display flow rate or percentage of the gas or liquid only.

The embodiment described above is a predominantly a liquid flow multiphase meter. The principles of operation can be used in alternative apparatus for a predominantly gas flow multiphase metering. For this type of apparatus, the TOF and Doppler flow meters are gas meters rather than liquid meters. Models such as the 1010GN-S9 dual channel flow computer (which can be supplied by Able Instruments & Controls Ltd, of Reading, United Kingdom) can provide a dual path clamp on USM gas flow measurement.

A gas Doppler meter measures the velocity of suspended liquid drops in the gas (whereas a liquid Doppler is measures the velocity of the gas bubbles in the liquid). The frequency at which a gas meter may differ from that of a liquid meter and the signal strengths involved may also differ. A gas density comparison against gas sonic velocity allows the liquid entrainment to be quantified in much the same way as gas in the liquid. That is, the density increases during wet gas entrainment although the gas sonic velocity of the flow path remains the same. Therefore, the wet gas concentration can be calculated. It is also possible to calculate different volumes/rates of different gasses present in the total gas volume (in a similar manner to the percentage water/oil calculation described above for liquids), but this is not necessarily required. Alternative embodiments using gas and/or liquid meters will now be described.

Figure 5:
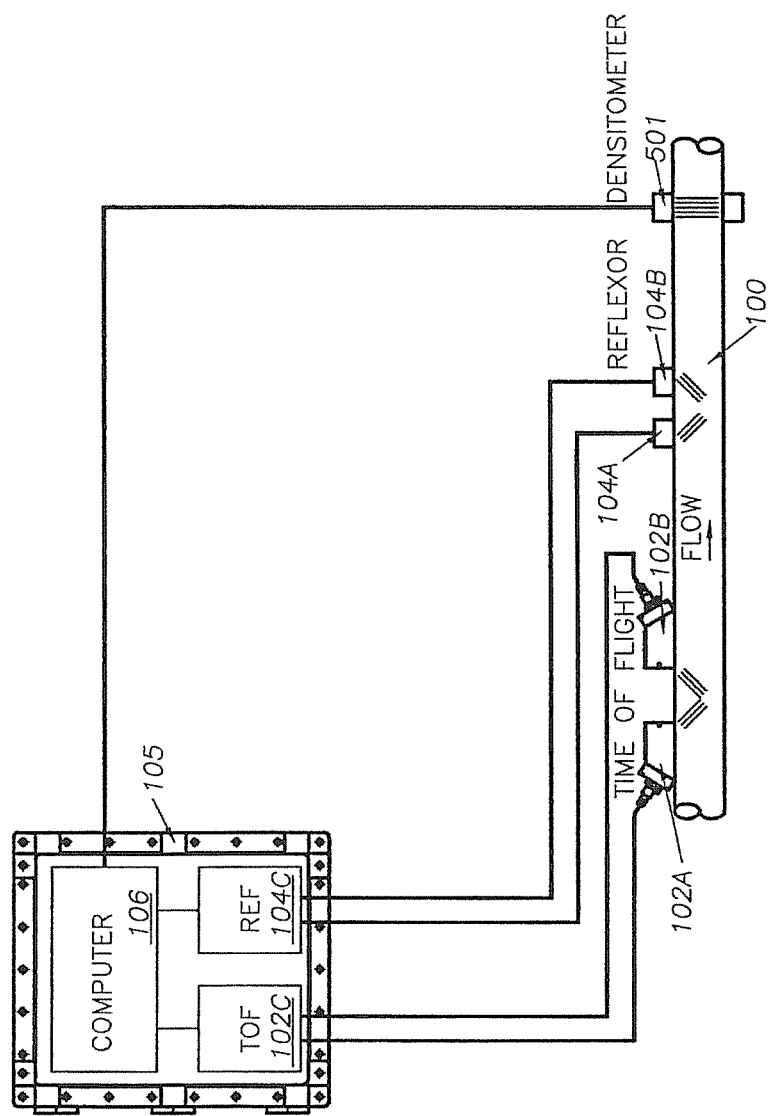
FIGS. 5 to 7 are schematic drawings of alternative versions of the apparatus.

FIG. 5 shows apparatus including TOF flow computers 102, Doppler flow computers 104 and a densitometer 501 and is particularly useful for heavy entrainment applications where continuous measurement is required, and where high accuracy of the liquid measurement must be maintained even into the very high gas entrainment levels. It is also useful for applications where it is necessary to quantify the percentage of the gas or solid phase in the liquid.

The embodiment of FIG. 5 can use dual channel TOF and single channel Doppler meters. However, any numbers of paths are possible. The apparatus can use temperature and pressure transmitter inputs (not shown) from the pipeline or spool for the purpose of viscosity compensation. Where possible, sonic velocity may be used along with the densitometer to resolve changes in the liquid cut, where the liquid is a mixture of different fluids such as water in crude oil. With the densitometer present, the code can perform correction of the flow volume based upon changes to the density.

The correction of the flow volume for mass flow calculation based upon the product density is in accord with standard mathematical principles that will be known to the skilled person. Where the densitometer is used to resolve dual phase flow calculations, the method is based upon calibration of the apparatus on a simulation flow rig, where changes in density, viscosity and sonic velocity are recorded against volumetric flow measurements. This information is used to derive a calibration curve for changing flow conditions which is tabulated and entered into the program code. Once calibrated the apparatus refers to this calibration table to derive flow calculations of the various phases during changing flow conditions according to the known calculations from the calibration of the apparatus. In practise, these curves and tables may become part of a calibration library that is transferable to other installations to allow setup without a direct calibration being required.

Figure 6:
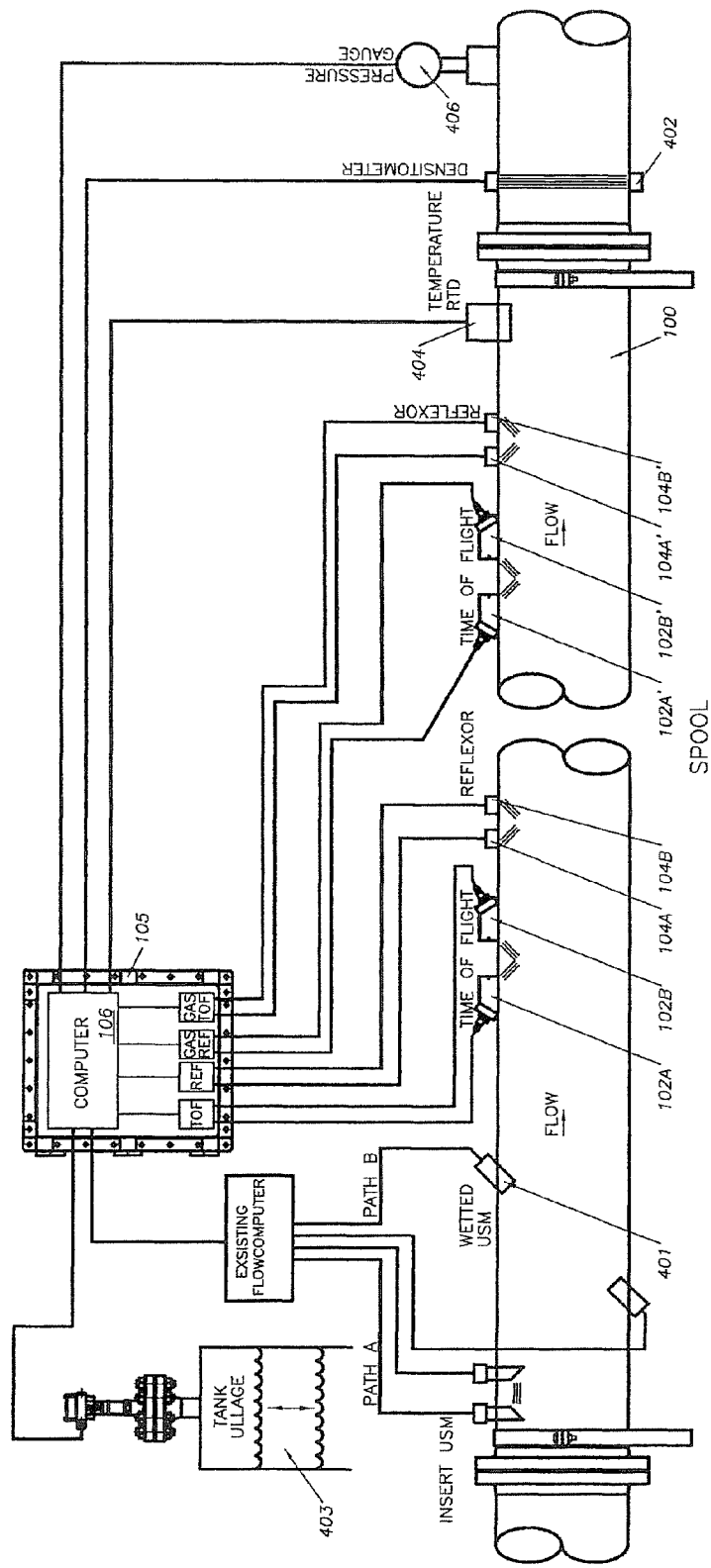

FIG. 6 shows an example version of the apparatus with multiple flow paths and flow metering measurement inputs, and instrumentation which may include clamp-on, inserted or wetted USM technologies 401, including Doppler meters 104, 104', as required by a particular application. At least some of the measuring devices may be part of an existing metering system, whilst other components can be additionally fitted when installing the apparatus. Such apparatus is particularly useful for applications where different flow meter types are available to achieve continuous measurement, and where high accuracy of the liquid measurement needs to be maintained, even into the very high gas entrainment levels. Such apparatus may include densitometer 402 measurements and/or storage tank 403 ullage, where the level change in the tank over time is used as a total flow calculation input into the flow computer over the same period. This total flow measurement may be used for comparison or self calibration of the flow metering output, such as by periodic adjustments made by comparing daily flow totals against storage tank ullage levels from tank level transmitters. The apparatus can further include a temperature sensor 404 and/or pressure gauge 406. The outputs of these measuring devices can be used by the main flow computer 108 to provide a calculation of product viscosity.

Figure 7:
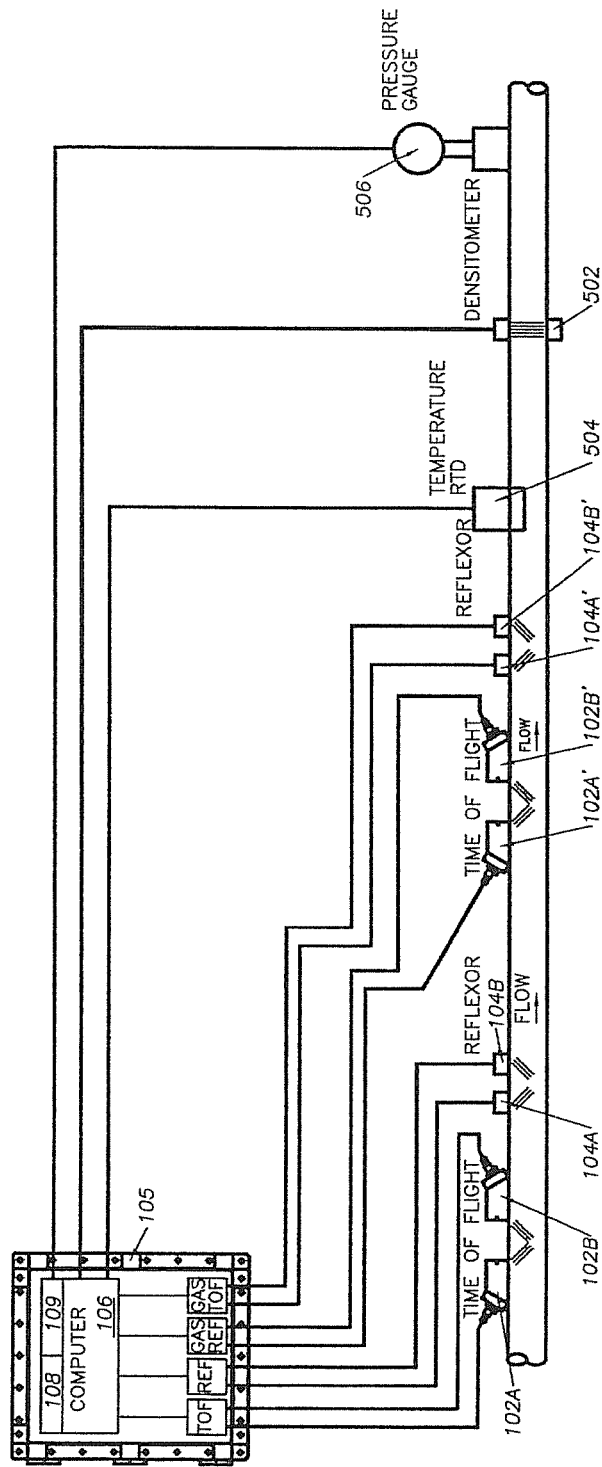

FIG. 7 shows an embodiment including liquid TOF meters 102, liquid Doppler meters 104, gas TOF meters 102', gas Doppler meters 104' and a densitometer 502. The embodiment can be particularly useful for applications where the product consists of several phases, and measurement of each phase is required, and where accuracy of the liquid measurement must be maintained even into the very high gas entrainment levels. It is also useful for applications where the product phases must be quantified from fully liquid all the way through the different stages of gas entrainment phases through to wet gas and on to fully gas phases within one flow computer. This version combines the embodiment of the liquid multiphase and the wet gas multiphase meters into one meter able to meter the individual phases as the product changes from liquid through to gas. The principle described above that provides cross calibration between the TOF and Doppler flow meters during phase changes can again be utilised to provide cross calibration between the liquid Doppler and gas Doppler meters as the phases change between gas suspended in liquid phase through to liquid suspended in gas phases and visa versa. The apparatus further includes a temperature sensor 504 and a pressure gauge 506 and can utilise the temperature and pressure transmitter inputs from the pipeline or spool for viscosity compensation of the liquid and compressibility compensation for the gas phase. Where possible, sonic velocity may be used along with the densitometer to resolve changes in the liquid cut, where the liquid is a mixture of different fluids such as water in crude oil.

The gas TOF meter 102' in the example is a clamp-on type. As with liquid, when gas flows it affects the propagation of the sonic pulse through the liquid, with a different effect upstream and downstream which can be measured and calculated into a velocity of the gas. The volumetric flow is then calculated based upon the pipe internal area which is calculated in the flow computer. Where necessary, pressure and temperature inputs can be used to make corrective adjustments for the compressibility of the gas, since both temperature and pressure greatly affect the density concentration of the gas in the measured volume of flow. The flow is then calculated in the flow computer and can be normalised to standard flow conditions. The flow can be converted to the volume it would be at a known temperature and pressure standard.

The gas Doppler transducers 104A' 104B' send pulses through the gas in the pipe from the transmit transducer and if there are entrained liquid drops or solid or condensate particles suspended in the gas, then the sound is reflected back to the receive transducer. As with the liquid version, the frequency of the reflected wave is dependant upon the velocity of the entrained particle or droplet in the gas. The flow computer converts this frequency shift back into a velocity measurement. The flow computer collects all the velocity measurements and processes them into a velocity rate. As with TOF, the volumetric flow can then be calculated based upon the pipe internal area by the main flow computer.

Figure 8A:
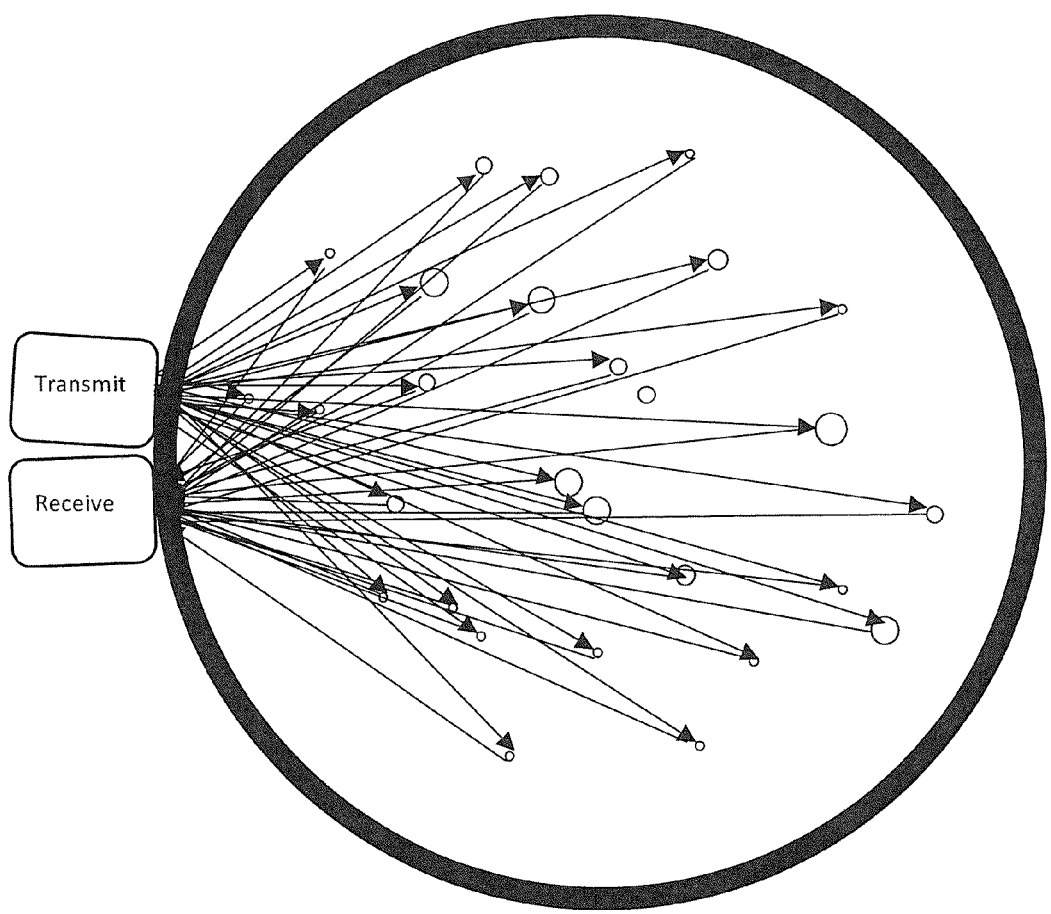
FIGS. 8A and 8B illustrate how pulsed Doppler transducer velocity measurements are timed.
Figure 8B:
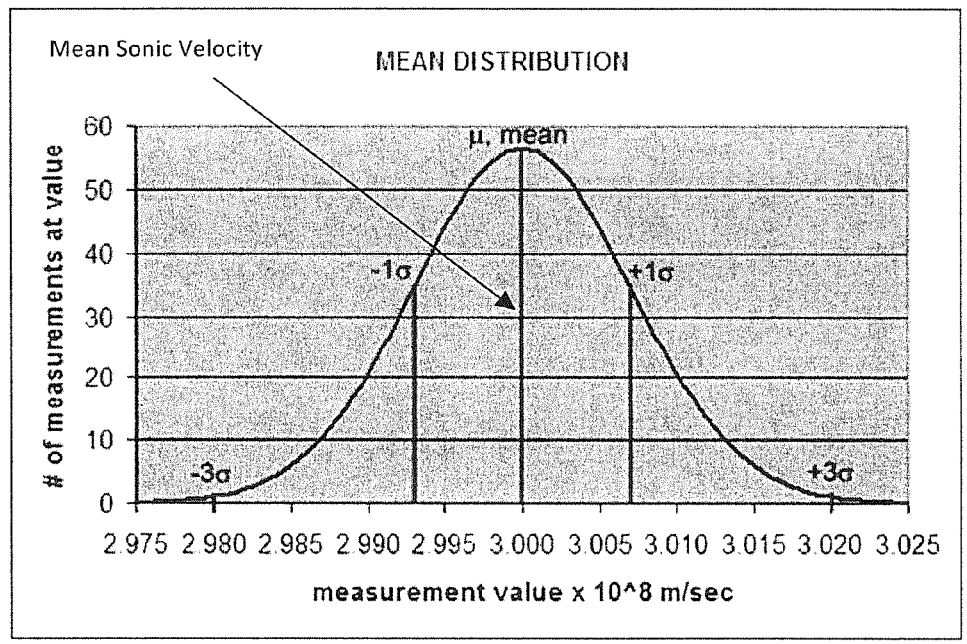

FIGS. 8A and 8B illustrate how pulsed Doppler transducer velocity measurements are timed. The mean transmit time for the multiple Doppler reflections can be calculated using mean distribution. The mean transit time is proportional to the sonic velocity of the fluid ultrasonic path and the result is calibrated against the time of flight sonic velocity measurement. Similarly for gas Doppler, the mean transit time is directly proportional to the sonic velocity of the gas ultra sonic path. The following formula can be used:

$$\bar{x} = \frac{\sum x}{n}$$

where $\Sigma$=the summation of all measurements, and n=the number of measurements. Therefore the average value x=the sum of all the measurements divided by the number of measurements.

For liquid Doppler measurement this method may be used to calculate the sonic velocity of the liquid deeper into the gaseous phase when the TOF sonic velocity measurement is less reliable. In turn, for gas Doppler measurement this method may be used to calculate the sonic velocity of the gas deeper into the wet gas phase when the gas TOF sonic velocity measurement is less reliable. Increasing the number of Doppler paths around the pipe or conduit improves the accuracy of the sonic velocity and flow velocity measurements for both liquid and gas Doppler methods.

The liquid sonic velocity measurement derived from the pulsed liquid Doppler signals can be cross calibrated against the liquid TOF meter sonic velocity measurement during the lower gas entrainment phase changes when both TOF and Doppler are active. In this way the Doppler sonic velocity measurement is more accurate deeper into the gaseous phase when the liquid TOF sonic velocity measurement is less reliable. In the same way, the gas sonic velocity measurement derived from the pulsed gas Doppler signals can be cross calibrated against the gas TOF meter sonic velocity measurement during the low wet gas entrainment phase changes when both TOF and Doppler are active. In this way the gas Doppler sonic velocity measurement is more accurate deeper into the wet gas phase when the gas TOF sonic velocity measurement is less reliable.

Figure 9:
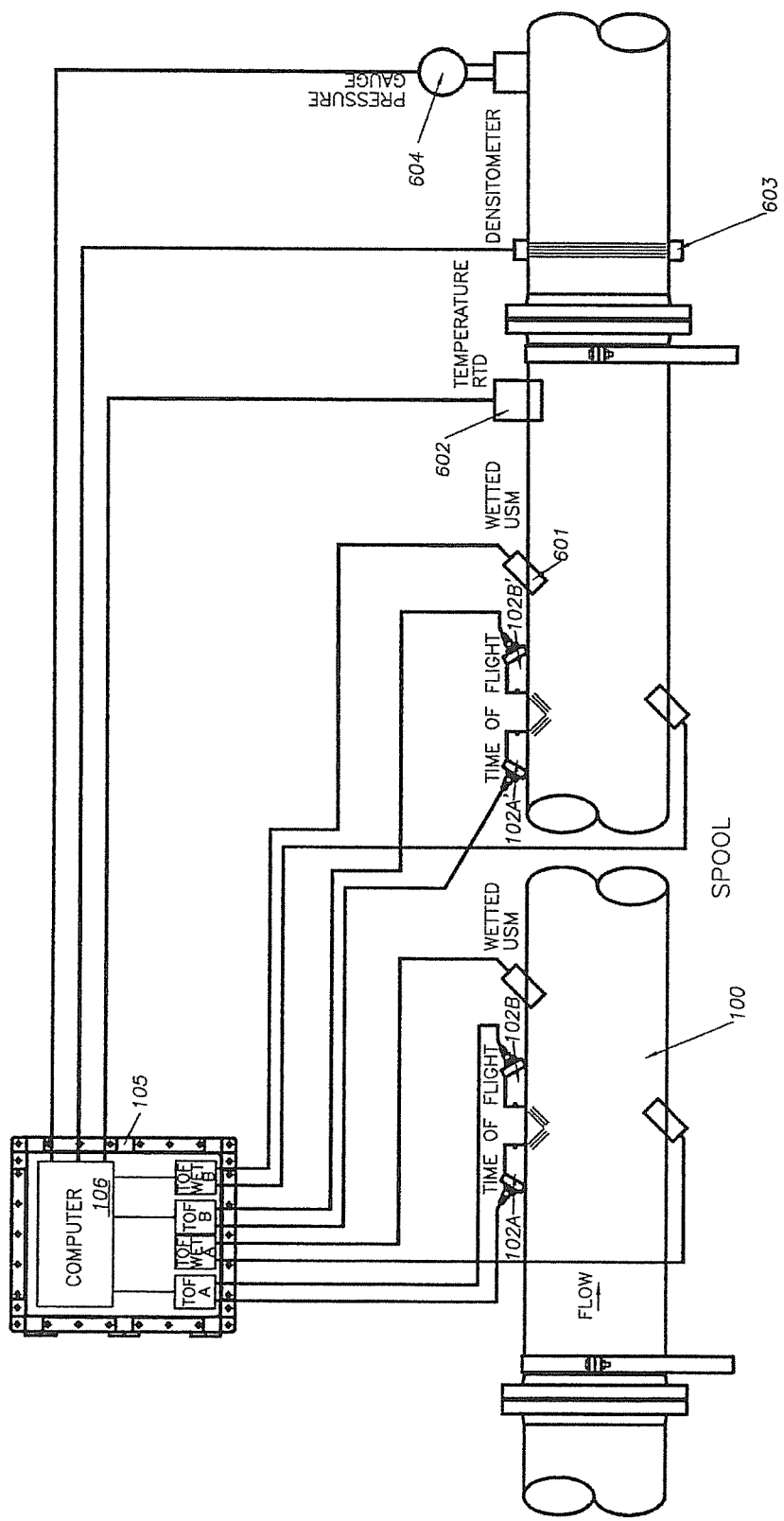
FIG. 9 is a schematic drawing of another alternative version of the apparatus.

FIG. 9 shows an embodiment of the apparatus particularly suitable for Custody Transfer Metering applications that also uses the intelligent voting and cross calibration routines. The apparatus can be predominantly used for crude oil custody transfer systems based upon a calibrated spool piece. The USM technology 601 may include single or multiple wetted transducer, and or clamp-on USM transducer paths. The CTM most usually includes temperature 602 and pressure transmitter 604 inputs from the pipeline or spool for crude oil viscosity compensation. As with other embodiments the temperature input can be a clamp-on RTD and the pressure and or temperature can input as fixed values into the computer. The apparatus may also include Doppler technology to ensure that occasional high gas entrainment periods are accounted for. The apparatus may also include any of the above features, including densitometer 603 or any other measurement instrumentation inputs into the flow calculation.

I claim:

1. A method of providing measurements relating to different phase components of a flowing fluid, wherein an entire phase range from 100% liquid flow to 100% gas flow can be measured, the method comprising:

obtaining at least one input representing a velocity of flowing fluid produced by a Doppler measuring device and/or a Time of Flight measuring device non-intrusively/externally mounted on a conduit containing the flowing fluid;

using the at least one velocity input to calculate a total volumetric flow of the flowing fluid;

obtaining measurements representing density of the flowing fluid;

using the velocity input and the calculated total volumetric flow to compute, using a computing device, a volumetric flow of a gas component of the flowing fluid using a formula:

gas volumetric flow=total volumetric flow−((measured density/base density)×total volumetric flow), where the base density is calculated using the formula:

base density=measured liquid sonic velocity/highest liquid sonic velocity)×highest density, where the highest density is a density of a liquid in the flowing fluid having a highest density, and the highest liquid sonic velocity is a sonic velocity of a liquid in the flowing fluid having a highest sonic velocity; and providing individual phase components of said flowing fluid as separate outputs based on the computed gas volumetric flow.

2. A method according to claim 1, wherein the flowing fluid comprises at least two different types of liquid (406, 408) and the method further includes determining proportions of the different types of liquid.

3. A method according to claim 1, including calculating proportions or percentages of liquid(s) and gas in the flowing fluid based on the calculated volumetric flow of the gas component of the flowing fluid.

4. A computer program element embodied on a non-transitory computer-readable medium which, when loaded on a computing device, executes the method according to claim 1.

5. An apparatus adapted to provide measurements relating to different phase components of a flowing fluid, wherein the flow of the liquid is measured continually from purely liquid phase (0% gas) to purely gas phase (0% liquid), the apparatus including:

at least one Doppler measuring device and at least one Time of Flight measuring device, non-intrusively/externally mounted on a conduit containing the flowing fluid, for measuring the flow velocity of flowing fluid;

a densitometer, non-intrusively/externally mounted on said conduit containing the flowing fluid for measuring density of said flowing fluid across the diameter of said conduit; and a computing device configured to perform the method of claim 1.

6. The apparatus according to claim 5, further comprising a calibration device configured to cross-calibrate said sonic velocity inputs obtained respectively from said pulsed Doppler measuring device and said Time of Flight measuring device during phase change periods when both measurement devices are operating together.

7. A method of providing measurements relating to different phase components of a flowing fluid, wherein an entire phase range from 100% liquid flow to 100% gas flow can be measured, the method comprising:

obtaining at least one flow velocity input representing a flow velocity of flowing fluid produced by a Doppler measuring device and at least one flow velocity input representing a flow velocity of flowing fluid produced by a Time of Flight measuring device non-intrusively/externally mounted on a conduit containing the flowing fluid;

using at least one of said flow velocity inputs to calculate a total volumetric flow of the flowing fluid; and using said at least one flow velocity input and the calculated total volumetric flow to compute at least one different phase component of the flowing fluid, wherein the flowing fluid comprises at least two different types of liquid and the method further includes using a computing device to determine the proportions of the different types of liquids by:

obtaining data representing sonic velocities of the different types of liquid following separation of the liquid;

using the obtained sonic velocity data and the said sonic velocity inputs, each representing a sonic velocity of flowing fluid to calculate the proportions of the different types of fluid;

selecting a preferred one of the sonic velocity inputs dependent on expected accuracy in current fluid flow conditions;

using the preferred sonic velocity input to compute the total volumetric flow rate of the different types of flowing fluid as a proportion of the total measured fluid volume; and providing, as separate outputs, data representative of respective proportions of said different types of flowing fluid based on the preferred sonic velocity input and the obtained sonic velocity data.

8. A method according to claim 7, further including comparing, using a computing device, the at least some of the flow velocity inputs with a historical average flow dataset to perform the selection of the preferred flow velocity input.

9. A method according to claim 8, wherein the comparison includes considering mean deviation of the flow velocity inputs over a number of previous readings.

10. A method according to claim 7, wherein the method includes using a computing device to apply an intelligent voting logic technique to select the preferred flow velocity input.

11. A method according to claim 7, wherein the preferred flow velocity input is selected by said computing device as a master input that is used thereby to cross-calibrate the other inputs.

12. A method according to claim 11, wherein the other flow velocity inputs are gradually adjusted by said computing device to be in agreement with the master input over a period of time.

* * * * *